W. B. LANE.

RATCHET MECHANISM FOR SCREW DRIVERS, WRENCHES, &c.

APPLICATION FILED JAN. 10, 1911. 2 SHEETS—SHEET 1.

Reissued Feb. 14, 1911. 13,205.

WITNESSES:

Robt. R. Mitchel.

Jos. G. Dennys Jr.

INVENTOR

William B. Lane

BY Charles N. Butler

ATTORNEY.

THE NORRIS PETERS CO., WASHINGTON, D. C.

W. B. LANE.

RATCHET MECHANISM FOR SCREW DRIVERS, WRENCHES, &c.

2 SHEETS—SHEET 2.

APPLICATION FILED JAN. 10, 1911.

Reissued Feb. 14, 1911.

13,205.

WITNESSES:

Robt. R. Kitchel.

Jos. G. Denny Jr.

INVENTOR

William B. Lane

BY

Charles M. Butler

ATTORNEY

THE NORRIS PETERS CO., WASHINGTON, D. C.

UNITED STATES PATENT OFFICE.

WILLEY B. LANE, OF PHILADELPHIA, PENNSYLVANIA, ASSIGNOR OF ONE-HALF TO J. C. McCARTY & CO., A CORPORATION OF NEW YORK.

RATCHET MECHANISM FOR SCREW-DRIVERS, WRENCHES, &c.

13,205. Specification of Reissued Letters Patent. Reissued Feb. 14, 1911.

Original No. 969,379, dated September 6, 1910, Serial No. 470,462. Application for reissue filed January 10, 1911. Serial No. 601,872.

*To all whom it may concern:*

Be it known that I, WILLEY B. LANE, a citizen of the United States, residing in the city of Philadelphia, county of Philadelphia, and State of Pennsylvania, have invented certain Improvements in Ratchet Mechanism for Screw-Drivers, Wrenches, and the Like.

My invention comprises a handle in combination with a ratchet mechanism and a bit, blade, chuck or shaft operated thereby. Its leading object is to provide a simple, strong and durable mechanism adapted for the use of interchangeable bits or blades and chucks for driving screws, bolts and nuts in either direction and capable of use in not readily accessible places. It is also adapted for turning shafts generally.

In the preferred construction, a handle has journaled therein, the shank of a bit or chuck on which is set a ratchet in the form of a pinion, and pivoted on the handle to revolve the ratchet in reverse directions is a double toothed pawl which is thrown and held by an element having a spring pressed bolt therein, the ratchet mechanism being adapted for ready inclosure and when desired is tightly inclosed within a casing. In uses such as require the revolution to be in one direction only, a single acting pawl may be substituted for the double acting pawl, and in such case provision is made for permitting the reverse movement of a shaft against the forward action of the ratchet mechanism, as is sometimes desirable.

Typical forms of my improvements are presented in the accompanying drawings and the following description thereof.

Figure 1:
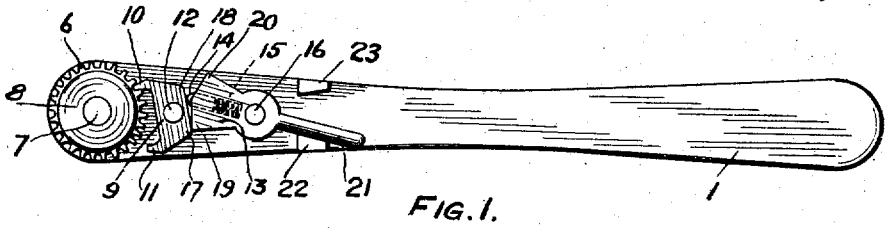
Figure 2:
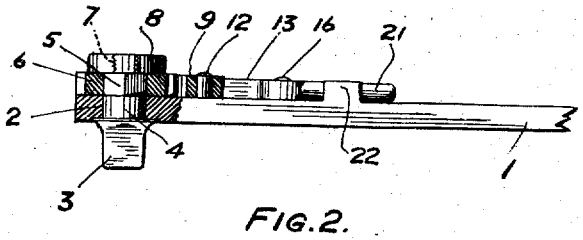
Figure 3:
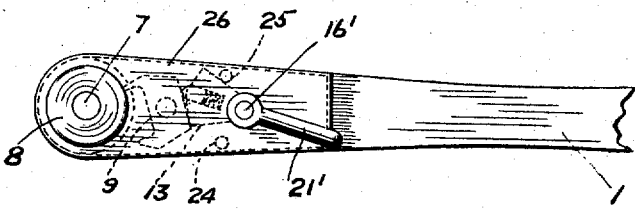
Figure 4:
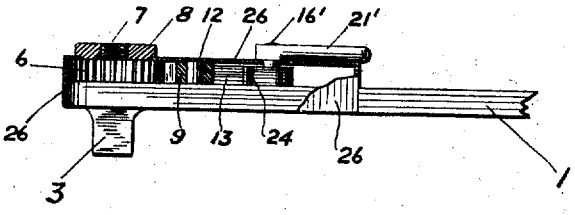
Figure 5:
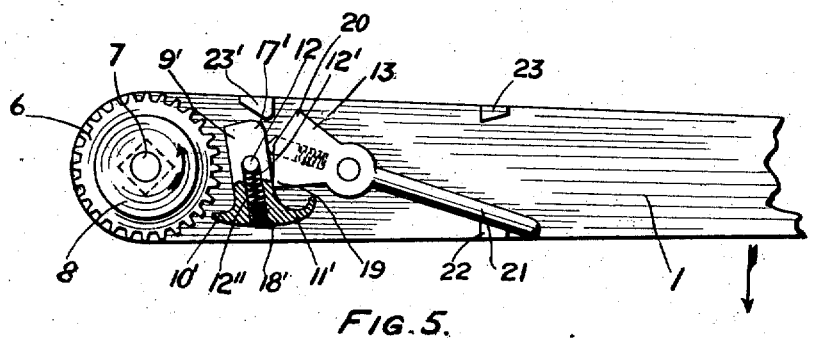

In the drawings, Figure 1 represents a plan view of a form of double acting mechanism embodying my improvements; Fig. 2 is a sectional elevation thereof; Fig. 3 is a plan view of a second form of mechanism embodying my improvements; Fig. 4 is a sectional side elevation of the construction shown in Fig. 3; Fig. 5 is a sectional view of a form of single acting mechanism embodying my improvements, and Fig. 6 is a sectional plan view showing a second position of the mechanism illustrated in Fig. 5.

The mechanism, as represented in the drawings, comprises the handle 1 having in the head thereof the cylindrical bearing 2. A blade, bit, chuck or shaft 3 is provided with a shank comprising the cylindrical section 4 journaled in the cylindrical bearing 2, the squared section 5 having fitted thereon a pinion or ratchet 6 with radially disposed teeth, and a threaded extension 7 engaged by a thumb nut 8 for holding the ratchet in place. By detaching the screw 8, the part 3 can be removed and a larger or different part having like members 4, 5, and 7 can be substituted therefor.

As shown in Figs. 1 to 4 inclusive, a pawl 9, having the teeth 10 and 11, is connected to the handle by the arbor 12, which permits of said pawl being oscillated and its teeth thrown alternately into engagement with the ratchet teeth. A pivot shearing and abutment affording element 13 having therein the centrally disposed bolt 14 pressed outwardly through the apex of said element by the spring 15, is connected to the handle by the arbor 16 or 16′. The element is movable by means of its arbor so that the bolt will bear against either side 17 or 18 of the lever-like pawl to hold the tooth thereof in engagement with the ratchet, while the corresponding shoulder or flank 19 or 20 of the pivoted shifting element will support the side of the pawl opposite that engaged by the bolt, to relieve some of the pressure on the pawl arbor. The bolt permits the engaging tooth to ratchet, and when shifted by moving the shifting element finger piece, causes the opposite tooth of said pawl to correspondingly engage. The flanks 19 and 20 of the shifting element are disposed at such an angle to each other that but a relatively slight movement of the finger piece 21 is necessary in order to shift the pawl, and the said flanks are, further, positioned upon a forward extension of the shifting element so that the thrust upon the same exerts a shearing rather than a bending stress upon the shifting element arbor, permitting the parts to be made light and more compact. My object has been to produce a tool having as few and simple parts as possible, and to so arrange said parts with respect to each other that by mutual co-action the stresses developed in the tool, when in use, may be distributed upon the several lugs and pins so that no member need be made specially heavy. This arrangement also permits the handle to be made quite thin and substantially flat, free from recesses, other than that in which the tool is journaled, and hence may be cheaply drop-forged or cast.

Figure 6:
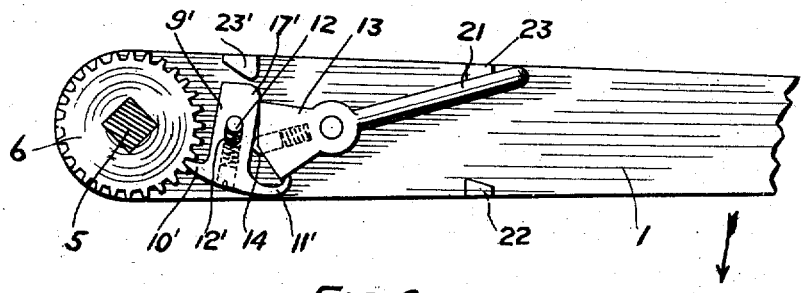

In the construction shown in Figs. 5 and 6, there is provided a pawl 9′ having a slot 12′ which contains the arbor 12 and a coiled spring 12″ permitting the pawl a limited movement longitudinally as well as axially on the arbor. The arms or sides 17′ and 18″, in different positions of the pawl, are supported by the respective flanks 19 and 20 of the pawl shifting element, one of the shoulders and the bolt 14 simultaneously engaging the arms on opposite sides of the arbor. A tooth 10′ of the pawl engages the ratchet wheel and a tooth 11′ engages a portion of the body of the pawl shifting element. A lug 23′ on the handle provides a stop which is adapted for engaging the arm 17′ when excessive force is applied, either to the ratchet wheel or the handle, in the directions of the arrows thereon in Fig. 5, upon which the mechanism is thrown from the position shown in Fig. 6 to that shown in Fig. 5. Or the mechanism may be thrown from one position to the other by means of the finger piece which moves the pawl shifting element. When operated to throw the mechanism to the position shown in Fig. 6, on drawing the handle in the direction of the arrow of this figure, the ratchet will turn if offering a limited resistance, while on moving the handle in the opposite direction the pawl will ride over the ratchet teeth and reengage.

As shown in Figs. 1, 2, 5, and 6, the shifting element finger piece 21 is engaged and held in its alternate positions by the limiting lugs 22 and 23 on the handle.

As shown in Figs. 3 and 4, the shifting element 13 is fixed to an arbor 16′ which is journaled in the handle and a finger piece 21′ is fixed to the arbor to throw said element and pawl, the movement of the element being limited by the lugs 24 and 25 on the handle. A casing 26 is fixed to the handle so as to cover the shifting element, bolt, pawl and ratchet, the arbor extending through the cover to an engagement with the finger piece which is exterior to the cover and the nut 8 making a close fit with the cover through which it extends.

Having described my invention, I claim:

1. A ratchet mechanism for screw drivers, socket wrenches or the like, comprising a handle, a tool journaled therein, a ratchet for said tool, a toothed pawl pivoted on said handle, a pivoted element having a portion thereof formed with engaging flanks angularly disposed with respect to each other, both of said flanks being forwardly positioned at all times with respect to the pivotal point of said element, said element further comprising a finger piece, a small displacement of which shifts one or the other of said angularly disposed flanks into juxtaposition with the respective side of said pawl, and a spring pressed part coöperating with said pivoted element and said pawl, substantially as described.

2. A ratchet mechanism for screw drivers, socket wrenches or the like, comprising a handle, a tool journaled in said handle, a ratchet for rotating said tool, a toothed pawl pivoted on said handle, a pivoted element having a portion thereof formed with engaging flanks angularly disposed with respect to each other, both of said flanks being at all times forwardly disposed at a relatively considerable distance with respect to the pivotal point of said element, said element further comprising a finger piece, a small displacement of which shifts one or the other of said angularly disposed flanks into juxtaposition with the respective side of said pawl, and a spring pressed part cooperating with said pivoted element and said pawl, substantially as described.

In witness whereof I have hereunto set my name this 29th day of December, 1908, in the presence of the subscribing witnesses.

WILLEY B. LANE.

Witnesses:

ROBERT JAMES EARLEY,

JOS. G. DENNY, JR.